US009214098B2

(12) United States Patent
Carlsson et al.

(10) Patent No.: US 9,214,098 B2
(45) Date of Patent: Dec. 15, 2015

(54) PROVIDING NAVIGATION INSTRUCTIONS IN A THREE-DIMENSION MAP ENVIRONMENT HAVING SETTABLE OBJECT TRANSPARENCY LEVELS

(75) Inventors: Stefan Carlsson, Bjärred (SE); Simon Ekstrand, Eslöv (SE); Jesper Alsed, Jonstorp (SE)

(73) Assignee: Vodafone Group Services Limited, Newbury, Berkshire (GB)

( * ) Notice: Subject to any disclaimer, the term of this patent is extended or adjusted under 35 U.S.C. 154(b) by 728 days.

(21) Appl. No.: 12/799,354

(22) Filed: Apr. 22, 2010

(65) Prior Publication Data

US 2011/0001751 A1 Jan. 6, 2011

Related U.S. Application Data

(60) Provisional application No. 61/202,994, filed on Apr. 27, 2009.

(30) Foreign Application Priority Data

Apr. 23, 2009 (EP) .................................... 09158644

(51) Int. Cl.
*G06T 15/00* (2011.01)
*G09B 29/10* (2006.01)
*G01C 21/36* (2006.01)

(52) U.S. Cl.
CPC .......... *G09B 29/102* (2013.01); *G01C 21/3638* (2013.01)

(58) Field of Classification Search
None
See application file for complete search history.

(56) References Cited

U.S. PATENT DOCUMENTS

| 5,367,615 | A * | 11/1994 | Economy et al. | 345/441 |
| 6,018,347 | A * | 1/2000 | Willis | 345/419 |
| 6,535,812 | B2 * | 3/2003 | Satoh et al. | 701/532 |
| 6,710,774 | B1 * | 3/2004 | Kawasaki et al. | 345/419 |
| 7,027,916 | B2 * | 4/2006 | Furukawa | 701/533 |
| 2003/0063094 | A1 * | 4/2003 | Smith | 345/581 |
| 2004/0049341 | A1 | 3/2004 | Fujiwara | |
| 2004/0158412 | A1 * | 8/2004 | Friedrich et al. | 702/31 |
| 2005/0104881 | A1 * | 5/2005 | Yoshida et al. | 345/419 |
| 2006/0089798 | A1 * | 4/2006 | Kaufman et al. | 701/211 |
| 2006/0244638 | A1 * | 11/2006 | Lettau | 340/995.1 |

(Continued)

FOREIGN PATENT DOCUMENTS

| DE | 100 23 160 A1 | 11/2000 |
| EP | 1 024 467 A2 | 8/2000 |

(Continued)

OTHER PUBLICATIONS

Erikson et al., HLODs for Faster Display of Large Static and Dynamic Environments, 2001, ACM, pp. 111-121.*

*Primary Examiner* — Ulka Chauhan
*Assistant Examiner* — Anh-Tuan V Nguyen
(74) *Attorney, Agent, or Firm* — Knobbe, Martens, Olson & Bear, LLP (57) ABSTRACT

A method in a device for providing navigation instructions in a three-dimensional map environment comprises receiving a start and end positions, determining a route, determining graphical two-dimensional map data, generating navigation instructions comprising setting a transparency level and transmitting the navigation instructions to a display. Corresponding device and computer program product are also provided.

21 Claims, 6 Drawing Sheets

(56) References Cited

U.S. PATENT DOCUMENTS

| | | | |
|---|---|---|---|
| 2007/0085860 A1* | 4/2007 | Schmitt | 345/629 |
| 2007/0103480 A1* | 5/2007 | Suzuno et al. | 345/582 |
| 2007/0112711 A1* | 5/2007 | Heidenreich et al. | 706/45 |
| 2008/0027634 A1* | 1/2008 | Obradovich et al. | 701/208 |
| 2008/0062167 A1* | 3/2008 | Boggs et al. | 345/419 |
| 2008/0130500 A1* | 6/2008 | Retana et al. | 370/235 |
| 2008/0243380 A1* | 10/2008 | Han | 701/211 |
| 2008/0269964 A1* | 10/2008 | Majka | 701/7 |
| 2008/0312822 A1* | 12/2008 | Lucas et al. | 701/204 |
| 2009/0150064 A1* | 6/2009 | Geelen | 701/201 |
| 2009/0177393 A1* | 7/2009 | Tertoolen et al. | 701/212 |
| 2009/0197619 A1* | 8/2009 | Colligan et al. | 455/456.3 |
| 2009/0204326 A1* | 8/2009 | Knee et al. | 701/300 |
| 2009/0248297 A1* | 10/2009 | Feyersisen et al. | 701/206 |
| 2009/0284532 A1* | 11/2009 | Kerr et al. | 345/442 |
| 2009/0316951 A1* | 12/2009 | Soderstrom | 382/103 |
| 2010/0161208 A1* | 6/2010 | Akita et al. | 701/201 |
| 2010/0280747 A1* | 11/2010 | Achthoven | 701/200 |

FOREIGN PATENT DOCUMENTS

| | | |
|---|---|---|
| EP | 1 085 299 A2 | 8/2000 |
| EP | 1 189 176 A2 | 8/2001 |
| EP | 1 936 328 A1 | 6/2008 |
| JP | 10-170288 | 6/1998 |
| JP | 2006-084436 | 3/2006 |
| JP | 2006242888 | 9/2006 |
| WO | WO 02/41028 A2 | 5/2002 |
| WO | WO 2008038205 A2 * | 4/2008 |
| WO | WO 2008152396 A1 * | 12/2008 |

* cited by examiner

PROVIDING NAVIGATION INSTRUCTIONS IN A THREE-DIMENSION MAP ENVIRONMENT HAVING SETTABLE OBJECT TRANSPARENCY LEVELS

RELATED APPLICATIONS

This application claims priority to U.S. Provisional App. No. 61/202,994, filed Apr. 27, 2009, which is incorporated herein by reference.

TECHNICAL FIELD

This application relates to the field of digital maps and, more particularly, to a method, a device and a computer program product for providing navigation instructions in a three-dimensional map environment.

BACKGROUND OF THE INVENTION

Global Positioning System (GPS) vehicle navigation systems utilise satellites to determine the location of the vehicle on a map and to provide route-planning and navigation guidance, thereby avoiding the need for folded paper maps and printed directions. Different types of such vehicle navigation systems have been presented. Typically the vehicle navigation systems comprise a user interface enabling a user to interact with the system. The user interface may be provided as a touch screen or as a set of keys. By actuating the interface a user may input information and retrieve mp information, such as navigation instructions, from the vehicle navigation system. Some systems provide three-dimensional maps, often called "bird's eye view", thereby providing a map view of the environment which is intended to mimic or closely correspond to the real environment and thereby further aiding the navigation of the user. With the introduction of GPS-enabled handheld communication devices, such as mobile phones, it is now also possible to use such devices for vehicle navigation purposes.

Also, as the navigation applications become more and more advanced more and more information may be incorporated into the displayed map information. However, as the displayed amount of information increases this may also lead to a map view which is cluttered or even unintelligible. It may even be difficult for a user to correctly identify the navigation route provided by the vehicle navigation system. More over, since the user may need to spend more time to analyse the large amount of displayed information he may compromise the safety. Thus, there remains a need to for a vehicle navigation system that is advanced but yet provides a comprehendible and understandable user interface.

Accordingly, it would be desirable to solve or at least reduce the problems discussed above. In particular, it would be desirable to provide a method, a device and a computer program product that, in a simplified way, provides improved three-dimensional map data in a vehicle navigation system. It would further be desirable to provide an adjustable three-dimensional map data in a vehicle navigation system and to associate graphical three-dimensional map objects data with a transparency level.

SUMMARY

According to a first aspect of the system described herein, a method performed in a device for providing navigation instructions in a three-dimensional map environment comprises receiving a start position and an end position, determining a route from the start position to the end position, determining, for a position on the route, graphical two-dimensional map data related to the position, retrieving the graphical two-dimensional map data, generating, for the position of the route, navigation instructions by projecting the graphical two-dimensional map data on a plane in a three-dimensional map environment and adding a representation of said route, adding graphical three-dimensional map objects to the projected graphical two-dimensional map data by utilising the graphical three-dimensional map objects data, and setting a transparency level of the graphical three-dimensional map objects, and transmitting the navigation instructions to a display.

By graphical two-dimensional map data is meant map data in two dimensions, such as provided on ordinary foldable paper maps. By projecting the graphical two-dimensional map data on a plane in a three-dimensional map environment a more lifelike navigation system may be provided. Since the three-dimensional map environment is transmitted to a display the added third dimension may be viewed as an imaginary third axis in the map environment allowing the three-dimensional shape of an object to be indicated.

The embodiments are based on the realisation that by providing a settable transparency level of the graphical three-dimensional map objects improved navigation instructions may be obtained.

The method may further comprise receiving information pertaining to adjusting the transparency level. The transparency level may be adjusted according to the received information.

Thus one advantage may be that the transparency level may be adjusted depending on received information. For example, the received information may pertain to user input. One advantage may then be that the transparency level may be user adjustable. For example, the received information may pertain to map properties. One advantage may then be that the transparency level may be adjusted in dependency of map properties.

The method may further comprise receiving information pertaining to a mode of transportation for the device. The transparency level may depend on the mode of transportation.

Thus one advantage may be that the transparency level change with the mode of transportation, thereby adapting the navigation system for different modes of transportation.

The method may further comprise receiving information pertaining to a transportation speed for the device. The transparency level may depend on the transportation speed. This may be advantageous since users of different modes of transportation may require different navigation information.

Thus one advantage may be that the transparency level change with the transportation speed, thereby adapting the navigation system for different transportation speeds. This may be advantageous since users travelling at different transportation speeds may require different navigation information.

The step of setting a transparency level may comprise grouping the graphical three-dimensional map objects into at least two groups of graphical three-dimensional map objects. The step of setting a transparency level may comprise setting individual transparency levels for each one of the groups of graphical three-dimensional map objects.

Thus one advantage my be that such a grouping provides an efficient way of setting the transparency level to a specific group of graphical three-dimensional map objects. The grouping may depend on at least one property of the graphical three-dimensional map objects. The grouping may depend on the position of the route.

A first group of the at least two groups may comprise graphical three-dimensional map objects associated with the position of the route. A second group of the at least two groups may comprise graphical three-dimensional map objects not associated with the position of the route.

Thus one advantage may be that graphical three-dimensional map objects associated with the same position may be grouped together and thereby associated with the same transparency level.

The method may further comprise retrieving information pertaining to individual distances between the position of the route and each one of the graphical three-dimensional map objects. The transparency level of each one of the graphical three-dimensional map objects may depend on the individual distances.

Thus one advantage may be that graphical three-dimensional map objects located within a certain distance of the position may be set to a certain transparency level.

The step of setting a transparency level may comprise determining at least one of the graphical three-dimensional map objects to be located at a position in the three-dimensional map environment such that a rendered surface of the at least one of the graphical three-dimensional map objects at least partly overlaps the route. A transparency level of the at least one of the graphical three-dimensional map objects may be set such that the route is visible through the rendered surface.

Thus one advantage may be that the transparency level of a graphical three-dimensional map object located such that it "blocks" the view of the route may be set to a high level. This may be advantageous since it may allow a user to receive information regarding a route although the route is "hidden" behind the graphical three-dimensional map object.

The method may further comprise receiving information pertaining to a current position of the route. The transparency level may depend on the current position.

The method may further comprise retrieving information pertaining to current individual distances between the current position and each one of the graphical three-dimensional map objects. The transparency level of each one of the graphical three-dimensional map objects may depend on the current individual distances.

The method may further comprise determining, for the position of the route, a graphical three-dimensional map objects data related to the position, retrieving the graphical three-dimensional map objects data, and adding the graphical three-dimensional map objects data to the three-dimensional map environment.

According to a second aspect of the system described herein, a device for providing navigation instructions in a three-dimensional map environment comprises a receiver for receiving a start position and an end position, a processing unit arranged to determine a route from the start position to the end position, determine, for a position on the route, graphical two-dimensional map data related to the position, retrieve the graphical two-dimensional map data, generate, for the position of the route, navigation instructions by projecting the graphical two-dimensional map data on a plane in a three-dimensional map environment and adding a representation of said route, adding graphical three-dimensional map objects to the projected graphical two-dimensional map data by utilising the graphical three-dimensional map objects data, and setting a transparency level of the graphical three-dimensional map objects, and a transmitter for transmitting the navigation instructions.

The device may further comprise a display for displaying the navigation instructions.

According to a third aspect of the system described herein, a computer program product stored on a computer-readable medium comprises computer program code portions adapted to perform the method as disclosed above when loaded and executed on a computer.

The second and third aspects may generally have the same features and advantages as the first aspect.

Other features and advantages of the system described herein will appear from the following detailed disclosure as well as from the drawings.

Generally, all terms used in the claims are to be interpreted according to their ordinary meaning in the technical field, unless explicitly defined otherwise herein. All references to "a/an/the [element, device, component, unit, means, step, etc]" are to be interpreted openly as referring to at least one in-stance of said element, device, component, unit, means, step, etc., unless explicitly stated otherwise. The steps of any method disclosed herein do not have to be performed in the exact order disclosed, unless explicitly stated.

BRIEF DESCRIPTION OF THE DRAWINGS

Embodiments of the system described herein will be explained in more detail herein with reference to the appended drawings, where the same reference numerals will be used for similar elements, and which are briefly described as follows.

DETAILED DESCRIPTION OF VARIOUS EMBODIMENTS

In the accompanying drawings certain embodiments are shown. The system described herein may, however, be embodied in many different forms and should not be construed as limited to the embodiments set forth herein; rather, these embodiments are provided by way of example so that this disclosure will be thorough and complete, and will fully convey the scope of the invention to those skilled in the art. Devices will be described in an operating mode.

Figure 1:
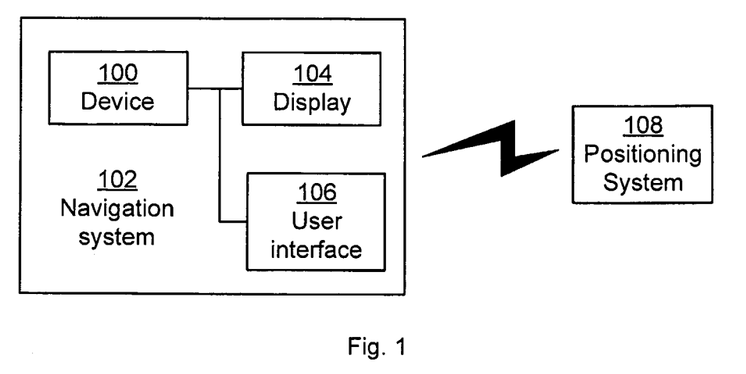
FIG. 1 is a schematic view of a device according to various embodiments.

FIG. 1 is a schematic view of a device 100 according to various embodiments. The device 100 may be part of a navigation system such as a vehicle navigation system 102, operatively connected to a (satellite) positioning system 108, such as the global positioning system (GPS). The device 100 may comprise, or be operatively connected to, a user interface 106 arranged to inter alia receive user instructions and display, using a display 104, information generated by the device 100. The display is thus arranged to present information, such as navigation instructions, to a user. It may be of any known type of display such as a liquid crystal display (LCD) or a plasma display panel (PDP).

Figure 2:
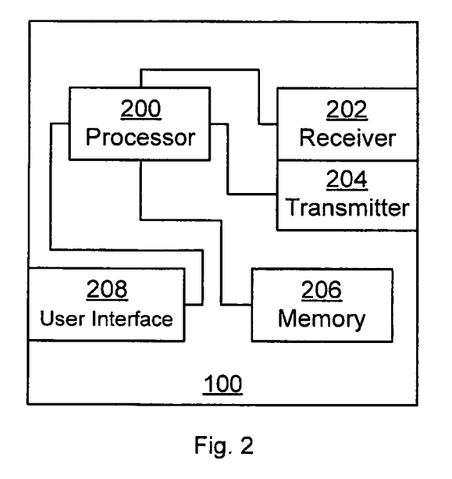
FIG. 2 is a schematic view of internal components of a device according to embodiments.

FIG. 2 is a schematic view of internal components of the device 100 of FIG. 1 according to various embodiments. The device 100 comprises a processing unit 200, or processor, which may be a central processing unit (CPU). The processing unit 200 is arranged to be operatively connected to a receiver 202, a transmitter 204 and a memory 206. The receiver 202 is configured to receive data signals from external units, devices, and apparatuses in any known manner. For example, the receiver 202 may be configured to receive user instructions from the user interface and satellite signals relating to position and/or time, such as signals from the global positioning system (GPS). Likewise, the transmitter 204 is configured to transmit data signals to external units, devices, and apparatuses in any known manner. The receiver 202 and the transmitter 204 may be part of a common transceiver configured to both receive and transmit data. The memory 206 may be configured to store software instructions pertaining to a computer-implemented method for providing navigation instructions in a three-dimensional map environment. The memory 206 may thus form a computer-readable medium which may have stored thereon software instructions. The software instructions may cause the processing unit 200 to execute the method according to embodiments of the system described herein.

The user interface 208 is arranged to receive user instructions and to present data processed by the processing unit 200 and/or received by the receiver 202 to a user. The user interface 208 may be operatively connected to the display 104. The user instructions may pertain to operations to be performed on the data items displayed by the display 104. Particularly the user instructions may pertain to operations associated with panning, zooming, and tilting the displayed data items. Further, the user instructions may pertain to time data and/or position data.

Figure 3:
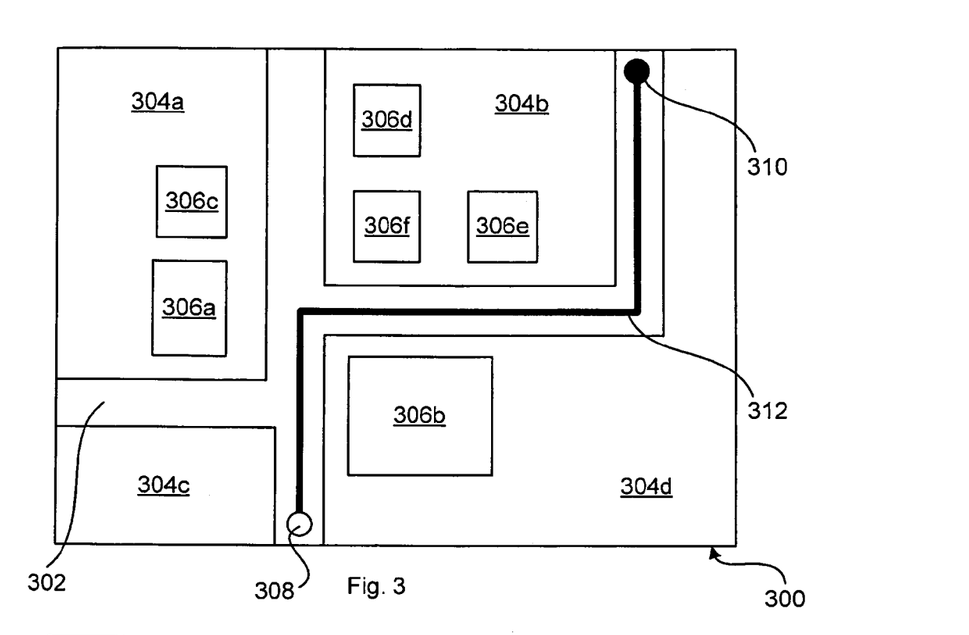
FIGS. 3-7 are illustrations of display views according to various embodiments.

FIG. 3 illustrates a display view 300 illustrating a two-dimensional map environment, comprising transportation paths 302 such as roads, footpaths, bicycle paths, railways and bridges, and ground areas 304*a-d* such as sidewalks, grounds, parks, grass, rivers and other bodies of water. Further, the map data may comprise graphical two-dimensional map objects 306*a-f*, such as buildings, individual trees, landmarks etc. The display view 300 also comprises information pertaining to navigation instructions. In the illustrative example of FIG. 3 the navigation instructions are illustrated by a start position 308, an end position 310 and a route generally illustrated by the solid line 312. The navigation instructions may thereby aid a user of the device to navigate along a route from the start position 308 to the end position 310 along the route 312.

Figure 4:
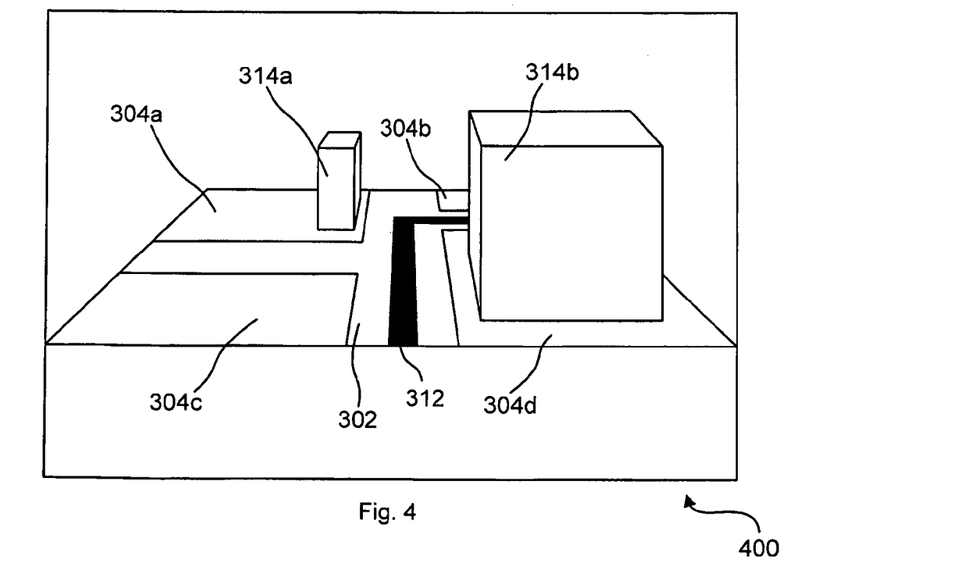

FIG. 4 illustrates a display view 400 illustrating a three-dimensional map environment for part of the two-dimensional map environment of FIG. 3. In the example in FIG. 4 the two-dimensional map objects 306*a* and 306*b* have been replaced by graphical three-dimensional map objects 314*a* and 314*b*, respectively. The graphical three-dimensional map objects 314*a-b* illustrate buildings having the shape of a parallelepiped. The graphical three-dimensional map objects 314*a-b* may be represented in different ways. As may be noted in FIG. 4 part of the route 312 is covered by the graphical three-dimensional map objects 314*b*.

Figure 8:
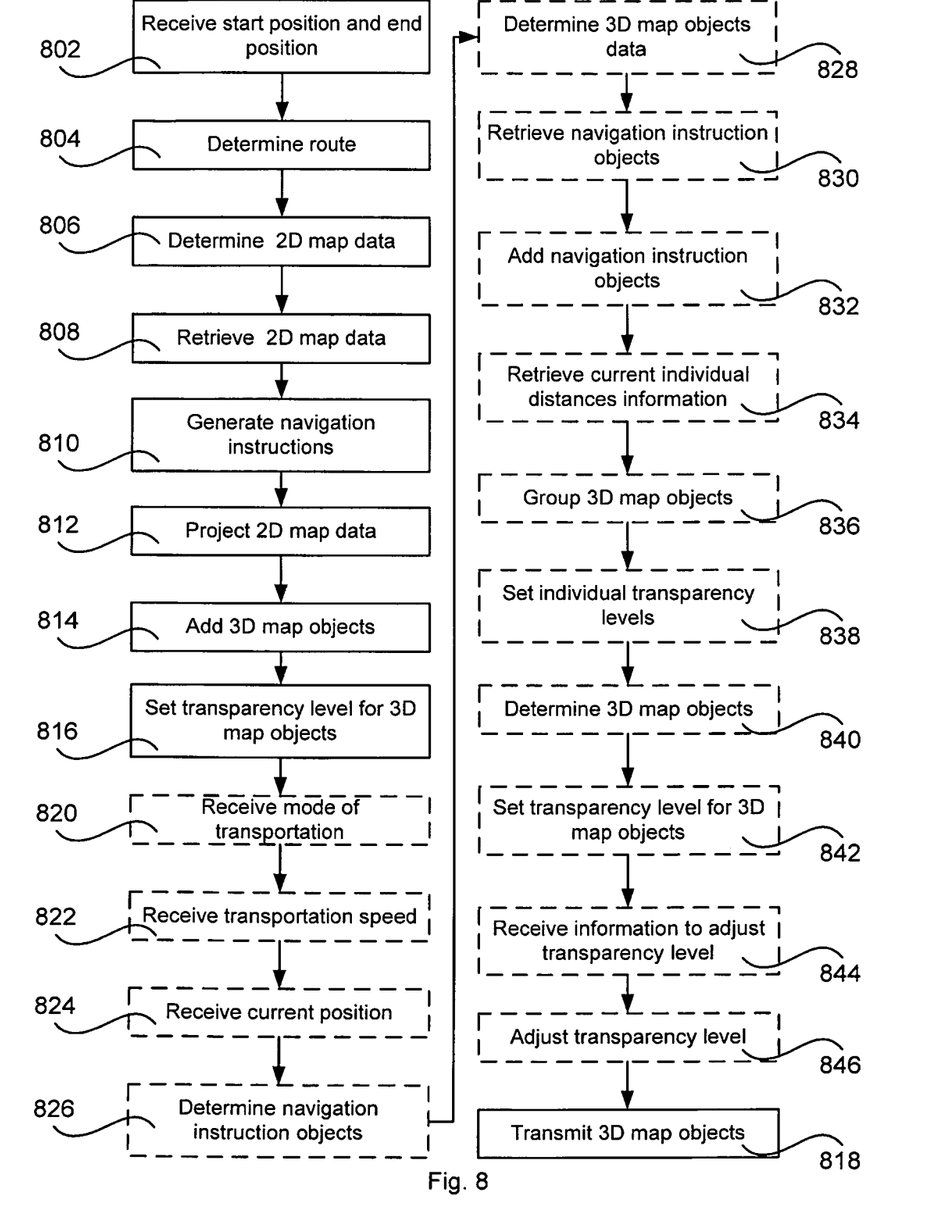
FIG. 8 is a flowchart according to various embodiments.

A method for providing navigation instructions in a three-dimensional map environment will now be described with reference to the flowchart of FIG. 8.

In a step 802 a start position and an end position are received by the device. The start position and the end position may typically correspond to a point of origin and a point of destination, respectively, of a journey. Typically the start and end positions are received via a user interface and then forwarded to the processing unit of the device. The start and end positions may be determined by a user in any known conventional manner, such as typing in addresses and/or locations associated with the start and end positions, choosing addresses and/or locations from drop menus, making selections on a display, and the like.

From the start position and the end position a route is determined from the start position to the end position, step 804. The route may be determined by the processing unit accessing map information comprising route information and from the map information determining one or more routes from the start position to the end position, inter alia by finding the route(s) corresponding to the shortest route from the start position to the end position. The processing device may have access to map data stored locally in the memory of the device or to map data stored remotely on a map data server. The shortest route may correspond to the route having the shortest travelling distance from the start position to the end position or the route having the shortest travelling time from the start position to the end position.

The route may depend on the mode of transportation. Thus according to embodiments information pertaining to a mode of transportation for the device may be received by the device, step 820. Also, according to embodiments information pertaining to a transportation speed for the device may be received by the device, step 822. Alternatively the device may comprise an internal speed measuring device. It will be further disclosed below how this information may be utilised in order to generate improved navigation information.

According to embodiments information pertaining to a current position of the route is received by the device and processed by the processing unit, step 824.

In a step 806 graphical two-dimensional map data related to a position on the route is determined by the processing unit. Thus map data needed for the route is determined. This minimizes the map information needed to be transmitted to the device since map data not associated with the route (such as map data pertaining to geographical locations distant from the route) may be excluded. The graphical two-dimensional map data is then retrieved, step 808.

Navigation instructions aiding the user of the device in his travel from the point of the origin to the point of destination may then be determined by the processing unit based on the determined route from the start position to the end position.

The navigation instructions are generated, step 810. In a step 812 the graphical two-dimensional map data is projected on a plane in a three-dimensional map environment and a representation of said route is added. In a step 814 graphical three-dimensional map objects are added to the projected graphical two-dimensional map data by utilising the graphical three-dimensional map objects data. In a step 816 a transparency level of the graphical three-dimensional map objects is set.

Figure 5A:
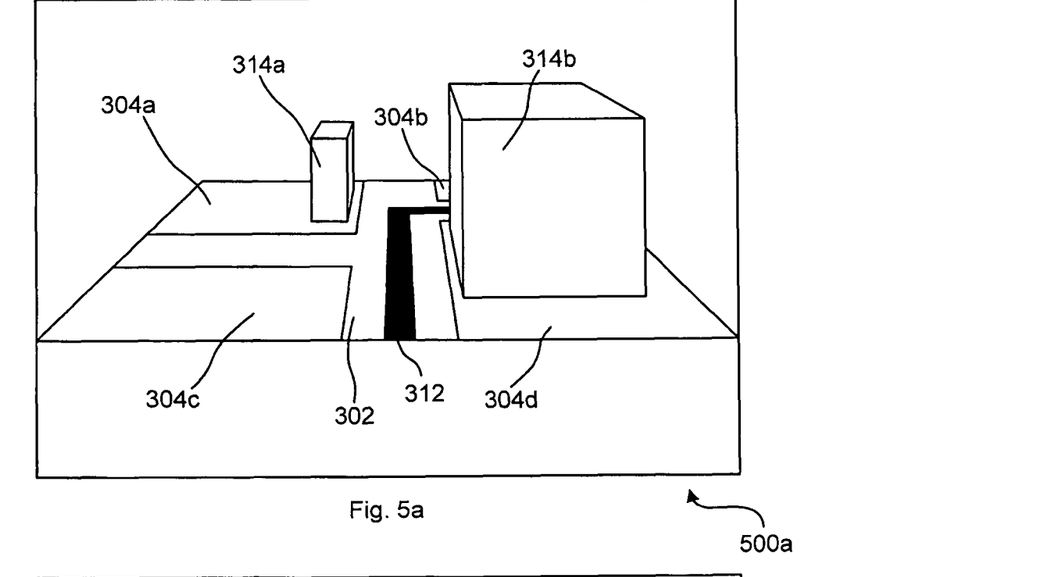
Figure 5B:
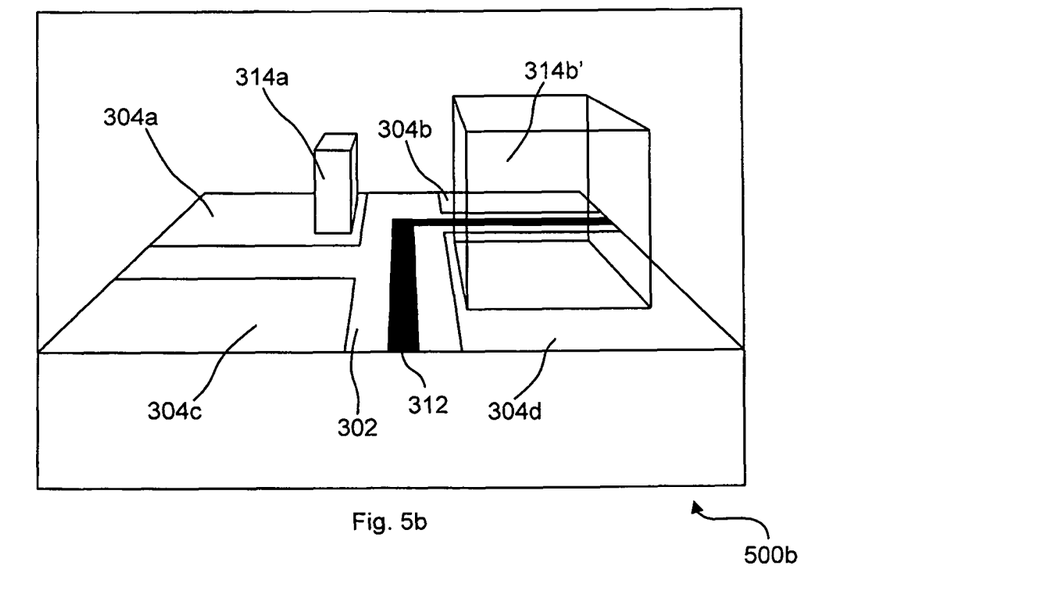
Figure 5C:
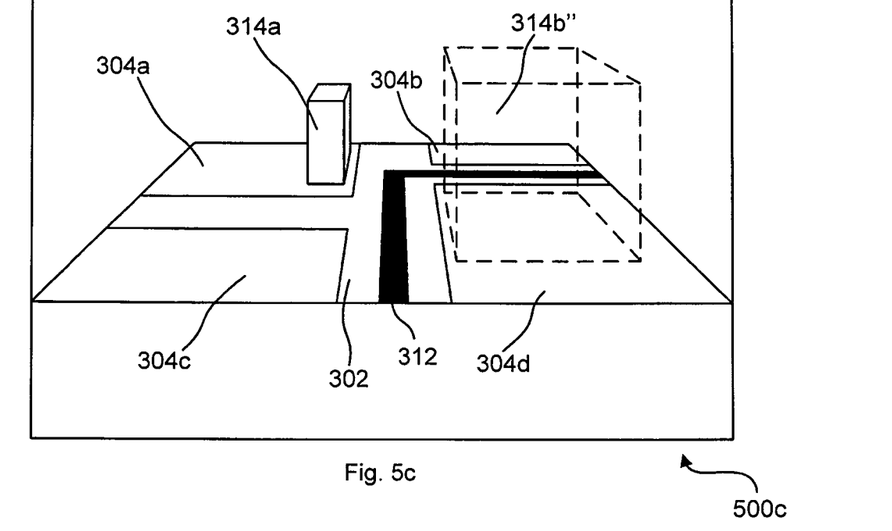
Figure 5D:
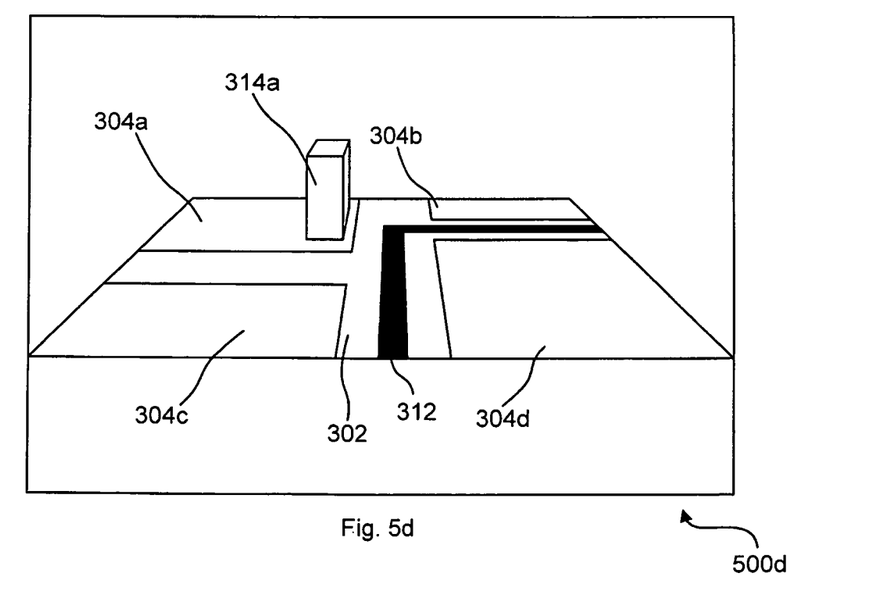

FIGS. 5*a*-5*d* illustrate display views 500*a*-500*d* comprising graphical three-dimensional map objects being displayed with different levels of transparency. In FIG. 5*a* the transparency level of the graphical three-dimensional map object 314*b* has been set to solid (i.e. low transparency). In FIG. 5*b* the transparency level of the graphical three-dimensional map object 314*b'* has been set to semi-transparent (i.e. medium-low transparency). In FIG. 5*c* the transparency level of the graphical three-dimensional map object 314*b"* has been set to fully transparent whilst the contours of the underlying building object has been indicated by dashed lines (i.e. medium-high transparency). In FIG. 5*d* the transparency level of the graphical three-dimensional map object has been set to high transparency such that the graphical three-dimensional map object is not visible.

The generated navigation instructions comprising the graphical three-dimensional map objects may be transmitted to the display, step 818. Thereby the navigation instructions may be provided to a user.

According to embodiments a route marker is determined for the position. Thus, in a step 826 one or more navigation instruction objects related to a position on the route is determined. In addition, graphical three-dimensional map objects data related to the position may be determined, step 828. The navigation instruction objects may then be retrieved, step 830. In a step 832 the navigation instruction objects data may be added to the three-dimensional map environment. For example, the navigation instruction objects may be provided as arrows provided along the route. Such navigation instruction objects may thus further aid the user of the device to perform the correct navigation manoeuvres. The navigation instruction objects may alternatively, or in addition, further comprise voice information containing short navigation messages, such as "next turn left", "next turn right", and so on.

In case the device has received information pertaining to the mode of transportation for the device in use, the transparency level may depend on the mode of transportation. In case the device has received information pertaining to the transportation speed for the device in use, the transparency level depends on the transportation speed. The information transmitted from the device to a user interface may then depend on the mode of transportation and/or the transportation speed. For example, a car driver may require different information than a lorry driver in terms of available routes. For example, for a bicycle rider information regarding trees or other vegetation objects may be useful, whilst this information may not be as useful for a car driver. Therefore the transparency level may allow trees and vegetation to be visible to a bicycle rider whilst this information may be optional for or even excluded from a car driver. For example, it may be desirable to transmit a smaller amount of information to a device travelling at higher speed than to the same device travelling at a lower speed. For example, as the device is associated with a higher transportation speed it may be more difficult to transmit accurate GPS data. For example, as the device is associated with a higher transportation speed it may be difficult for a user receiving the information to interpret a large amount of information whilst at the same time fully concentrating at correctly and safely operating the vehicle in which the device is mounted. Therefore, according to embodiments a high transportation speed is associated with a higher level of transparency than the transparency level associated with a lower transportation speed. The transparency level may gradually change with the speed.

Further, according to embodiments, in case the device has received a current position of the device the transparency level may depend on the current position. In particular, in a case a graphical three dimensional map object blocks the view of the route the graphical three dimensional map object may be associated with a high transparency level. For example, in the route makes a sharp turn and this turn is at least partly blocked by a graphical three-dimensional object the transparency level of this graphical three-dimensional object may, by the device, be set to a high level, see for example FIGS. 5a-5d as disclosed above. Thus the transparency level of a graphical three-dimensional object may change as the device progresses along the route. In other words, dynamic transparency levels may be enabled.

Figure 6:
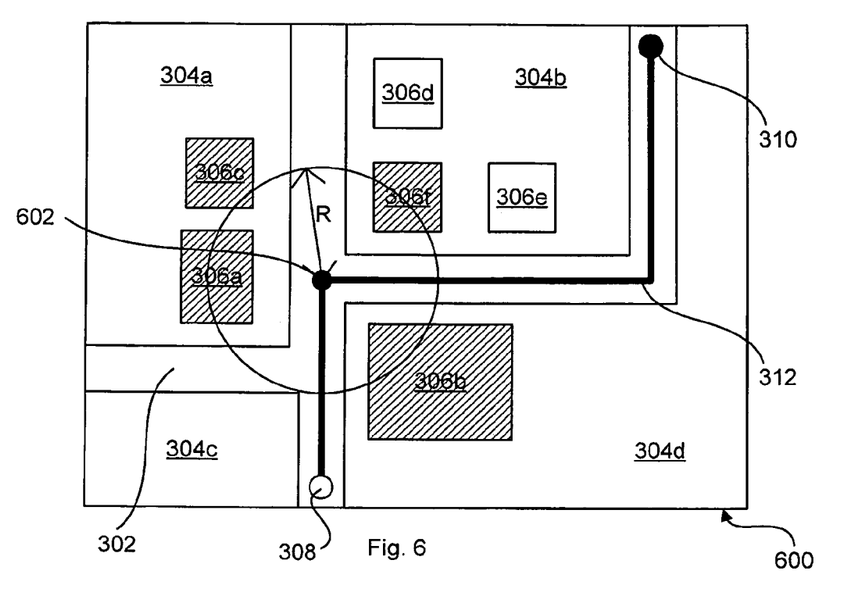

According to embodiments, in a step 834 information pertaining to current individual distances between the position of the device and each one of the graphical three-dimensional map objects is retrieved. The position may be the current position of the device. Particularly, as the distance depend on the current position of the device only such distances which correspond to graphical three-dimensional map objects currently displayed may be retrieved. The distance information may be updated according to the movement of the device. FIG. 6 illustrates a display view 600, similar to the display view 300, illustrating a two-dimensional map environment. Although the display view illustrates a two-dimensional scenario the general idea is applicable also to a three-dimensional environment, such as the display view 400 of FIG. 4. The display view 600 indicates a current position 602. In the display view 600 graphical two-dimensional map objects 306a, 306b, 306c, 306f within a predefined distance R of the current position have been marked by a diagonal line pattern. The graphical three-dimensional map objects corresponding to the marked graphical two-dimensional map objects may thus be associated with a higher transparency than the graphical three-dimensional map objects associated with the remaining (un-marked) graphical two-dimensional map objects.

Figure 7:
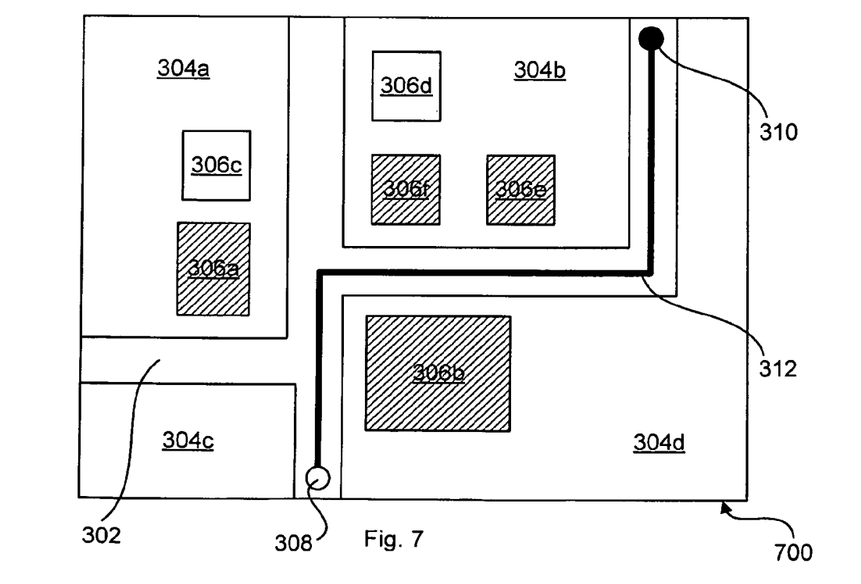

The position may also correspond to other positions along the route, for which position a large amount of data corresponding to graphical three-dimensional map objects need to be retrieved. For example, such a position may correspond to a position associated with a large number of graphical three-dimensional map objects. Information pertaining to the location of such positions may be pre-stored. FIG. 7 illustrates a display view 700, similar to the display views 300 and 600, illustrating a two-dimensional map environment. Although the display view illustrates a two-dimensional scenario the general idea is applicable also to a three-dimensional environment, such as the display view 400 of FIG. 4. In the display view 700 graphical two-dimensional map objects 306a, 306b, 306e, 306f associated with a point on the route (for example all graphical two-dimensional map objects adjacent to the route) have been marked by a diagonal line pattern. The graphical three-dimensional map objects associated with the marked graphical two-dimensional map objects may thus be associated with a higher transparency than the graphical three-dimensional map objects associated with the remaining (un-marked) graphical two-dimensional map objects.

Particularly, according to embodiments setting the transparency level comprises in a step 836 grouping the graphical three-dimensional map objects into at least two groups of graphical three-dimensional map objects (such as the groupings corresponding to the marked/un-marked objects, respectively, in FIG. 6 or 7). In a step 838 individual transparency levels for each one of the groups of graphical three-dimensional map objects may be set. The grouping may depend on the (current) position of the route.

Particularly, according to embodiments a first group of the at least two groups comprises graphical three-dimensional map objects associated with the position of the route. A second group of the at least two groups comprises graphical three-dimensional map objects not associated with the position of the route. That is, the first group may comprise graphical three-dimensional map objects having a small distance to the route (see FIG. 6). The second group may comprise graphical three-dimensional map objects having a large distance to the route. As the route is determined in advance this grouping may also be done in advance. Thereby it may be determined in advance which data information relating to graphical three-dimensional map objects that need to be transmitted as the device travels along the route.

Particularly the transparency level of each one of the graphical three-dimensional map objects may depend on the current individual distances. For example, the transparency may be set to a higher level for graphical three-dimensional map objects associated with a small distance between the current position and the graphical three-dimensional map object than the transparency level for graphical three-dimensional map objects associated with a large distance such distance. In general terms, the transparency level of the first group may thus be higher than the transparency level of the second group. This may reduce the data processed by the device since the rendering of graphical three-dimensional map objects associated with a small distance typically need to be updated more frequently than rendering of graphical three-dimensional map objects associated with a large distance. Also, it may be difficult for a user of the device travelling at a high speed to apprehend frequently updated information.

The transparency level of a graphical three-dimensional map object may depend on the route. For example, it may be advantageous that upcoming turns along the route are visible (and hence not blocked by rendered buildings or the like). In other words, in case three-dimensional map objects block the route, it may be advantageous to associate such three-dimensional map objects with a high transparency. This could enable a user of the device to better prepare for upcoming turns (see FIGS. 5a-5d).

Particularly, in a step 840 at least one of the graphical three-dimensional map objects is determined to be located at a position in the three-dimensional map environment such that a rendered surface of the at least one of the graphical three-dimensional map objects are determined to at least partly overlaps the route. In other words it may be determined whether or not there are graphical three-dimensional map objects, such as rendered buildings, that block the view of the route. A transparency level of the at least one of the graphical three-dimensional map objects may then be set, step, 842, such that the route is visible through the rendered surface. Alternatively the transparency level is set such that the at least one of the graphical three-dimensional map objects is excluded from the displayed map data.

As different operators of the device may be accustomed to different interfaces, map layouts, etc, it may be advantageous that the transmitted transparency level(s) is/are user adjustable. According to embodiments, in a step 844 information pertaining to adjusting the transparency level is received. For example, there may be provided a slide bar, keys (such as a "+"-key for decreasing the transparency level and a "−"-key for increasing the transparency level; decreasing the transparency level generally corresponds to transmitting a higher amount of information, and vice versa). In a step 846 the transparency level may then be adjusted by the device according to the received information.

Although the above exemplifications have related exclusively to the transparency level as such, the transparency level may also be associated with other layers of displayable graphical information. For example, the transparency level may relate to the amount of rendered texture information of the graphical three-dimensional map objects. For example, a high transparency level may correspond to a small amount of texture information to be generated. For example, for a building only the contour is generated in a case the transparency level is set high, whereas doors, windows, facade structure or the like may be rendered if the transparency level is set low. The number of colours used during the rendering may be determined in similar manners. Exclusion of texture information also reduced the data information required to be transmitted.

Although the above exemplifications have related exclusively to graphical three-dimensional map objects as such, graphical three-dimensional map objects may also correspond to the terrain of the ground associated with the map. That is, according to embodiments the transmitted amount of terrain information may be adjustable. A high level of transparency may correspond to a low level of terrain information, and vice versa. For example the terrain information may comprise information relating to the surface inclination. That is, the transparency level may be associated with terrain information. For example, the transparency level may relate to the amount of surface inclination. As an illustrating example, a typical scenario could be a map comprising a route associated with a sharp turn at an opposite side of the edge of a hill. In a case graphical terrain information is displayed it may be difficult for a user to correctly and safely manoeuvre the vehicle in which the device is mounted since the view of the route may be blocked by the graphical terrain information. As is the case for the graphical three-dimensional map objects the transmitted (and/or displayed) terrain information may depend on a number of factors.

Various embodiments discussed herein may be combined with each other in appropriate combinations in connection with the system described herein. Additionally, in some instances, the order of steps in the flowcharts or flow diagrams may be modified, where appropriate. Further, various aspects of the system described herein may be implemented using software, hardware, and/or a combination of software and hardware. Software implementations of the system described herein may include executable code that is stored in a computer readable storage medium and executed by one or more processors. The computer readable storage medium may include a computer hard drive, ROM, RAM, flash memory, portable computer storage media such as a CD-ROM, a DVD-ROM, a flash drive and/or other drive with, for example, a universal serial bus (USB) interface, and/or any other appropriate tangible storage medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method performed in a device for providing navigation instructions in a three-dimensional map environment, comprising:
   receiving a start position and an end position;
   determining a route from said start position to said end position;
   determining, for a position on said route, graphical two-dimensional map data related to said position;
   retrieving said graphical two-dimensional map data;
   generating, for said position of said route, navigation instructions by:
   projecting said graphical two-dimensional map data on a plane in a three-dimensional map environment and adding a representation of said route;
   adding graphical three-dimensional map objects to said projected graphical two-dimensional map data by utilising data of said graphical three-dimensional map objects;
   receiving information pertaining to a current position on the route;
   determining object-distance information pertaining to current individual distances between said current position and each one of said graphical three-dimensional map objects;
   receiving transportation-mode information pertaining to a mode of transportation for said device;
   setting a transparency level of each one of said graphical three-dimensional map objects, wherein the transparency level is set at a level between, and including, an opaque image and an image shown only in outline, and wherein the transparency level of each one of said graphical three-dimensional map objects is dynamically adjusted during travel along the route based on use of both the transportation-mode information and the object-distance information, the object-distance information being used to display a first group of graphical three-dimensional objects with a first transparency level that is different from a second transparency level of a second group of graphical three-dimensional objects different from the first group, and the transportation-mode information being used to display both the first and the second groups of graphical three-dimensional objects at a higher transparency level that corresponds to a first mode of transportation as compared to a lower transparency level that corresponds to a second mode of transportation lower than the first mode of transportation; and transmitting said navigation instructions to a display.

2. The method according to claim 1, further comprising:
receiving transportation-speed information pertaining to a transportation speed for said device;
wherein the transparency level of each one of said graphical three-dimensional map objects is dynamically adjusted during travel along the route based on use of the transportation-speed information, and the transportation-speed information being used to display both the first and the second groups of graphical three-dimensional objects at a higher transparency level that corresponds to a first transportation speed as compared to a lower transparency level that corresponds to a second transportation speed lower than the first transportation speed.

3. The method according to claim 1, wherein setting the transparency level further comprises:
determining at least one of said graphical three-dimensional map objects to be located at a position in said three-dimensional map environment such that a rendered surface of said at least one of said graphical three-dimensional map objects at least partly overlaps said route, and setting the transparency level of said at least one of said graphical three-dimensional map objects such that said route is visible through said rendered surface.

4. The method according to claim 1, further comprising:
determining, for said position of said route, a graphical three-dimensional map objects data related to said position;
retrieving said graphical three-dimensional map objects data; and
adding said graphical three-dimensional map objects data to said three-dimensional map environment.

5. The method according to claim 1, further comprising receiving transportation-speed information pertaining to transportation speed for said device, and wherein the transparency level adjustment of the first and the second groups based on use of the transportation-speed information changes gradually with the transportation speed.

6. The method according to claim 1, further comprising:
receiving information input by a user of the device pertaining to adjusting said transparency level, and wherein the transparency level of each one of said graphical three-dimensional map objects is further adjusted based on the information input by the user of the device.

7. The method according to claim 1, wherein the first group of graphical three-dimensional map objects are objects within a predefined distance of the current position on the route, and wherein the second group of graphical three-dimensional objects are objects beyond the predefined distance from the current position.

8. The method according to claim 1, wherein the first group of graphical three-dimensional map objects include objects that are on the route, and wherein the second group of graphical three-dimensional map objects include objects that are not on the route.

9. A method performed in a device for providing navigation instructions in a three-dimensional map environment, comprising:
receiving a start position and an end position;
determining a route from the start position to the end position;
determining, for a position on the route, graphical two-dimensional map data related to the position;
retrieving the graphical two-dimensional map data;
generating, for the position of the route, navigation instructions by:
projecting the graphical two-dimensional map data on a plane in a three-dimensional map environment and adding a representation of the route;
adding graphical three-dimensional map objects to the projected graphical two-dimensional map data by utilising data of the graphical three-dimensional map objects, wherein each of the graphical three-dimensional map objects comprise a plurality of layers of displayable graphical information;
receiving information pertaining to a current position on the route;
determining object-distance information pertaining to individual distances between a current position on the route and each one of the graphical three-dimensional map objects; and
setting a transparency level of the graphical three-dimensional map objects, wherein the transparency level is set at a level between, and including, an opaque image and an image shown only in outline, and wherein the transparency level of a particular one of the graphical three-dimensional map objects increases and rendering of the number of the plurality of layers of displayable graphical information of the particular one of the graphical three-dimensional map objects decreases as a distance between the current position and the particular one of the graphical three-dimensional map objects decreases; and
transmitting the navigation instructions to a display.

10. The method according to claim 9, wherein setting the transparency level further comprises:
determining at least one of said graphical three-dimensional map objects to be located at a position in said three-dimensional map environment such that a rendered surface of said at least one of said graphical three-dimensional map objects at least partly overlaps said route, and setting the transparency level of said at least one of said graphical three-dimensional map objects such that said route is visible through said rendered surface.

11. The method according to claim 9, further comprising:
determining, for said position of said route, a graphical three-dimensional map objects data related to said position;
retrieving said graphical three-dimensional map objects data; and
adding said graphical three-dimensional map objects data to said three-dimensional map environment.

12. The method according to claim 9, further comprising:

receiving information input by a user of the device pertaining to adjusting said transparency level, and wherein the transparency level of each one of said graphical three-dimensional map objects is further adjusted based on the information input by the user of the device.

13. A device for providing navigation instructions in a three-dimensional map environment, comprising:
a receiver for receiving a start position and an end position,
a processing unit that:
determines a route from the start position to the end position;
determines, for a position on the route, graphical two-dimensional map data related to the position;
retrieves the graphical two-dimensional map data, and
generates, for the position of the route, navigation instructions by:
projecting the graphical two-dimensional map data on a plane in a three-dimensional map environment and adding a representation of the route;
adding graphical three-dimensional map objects to the projected graphical two-dimensional map data by utilising data of the graphical three-dimensional map objects, wherein each of the graphical three-dimensional map objects comprise a plurality of layers of displayable graphical information;
receiving information pertaining to a current position on the route;
determining object-distance information pertaining to individual distances between a current position on the route and each one of the graphical three-dimensional map objects; and
setting a transparency level of the graphical three-dimensional map objects, wherein the transparency level is set at a level between, and including, an opaque image and an image shown only in outline, and wherein the transparency level of a particular one of the graphical three-dimensional map objects increases and rendering of the number of the plurality of layers of displayable graphical information of the particular one of the graphical three-dimensional map objects decreases as a distance between the current position and the particular one of the graphical three-dimensional map objects decreases; and
a transmitter for transmitting the navigation instructions.

14. The device according to claim 13, wherein the processing unit further:
determines at least one of said graphical three-dimensional map objects to be located at a position in said three-dimensional map environment such that a rendered surface of said at least one of said graphical three-dimensional map objects at least partly overlaps said route, and setting the transparency level of said at least one of said graphical three-dimensional map objects such that said route is visible through said rendered surface.

15. The device according to claim 13, wherein the processing unit further:
determines, for said position of said route, a graphical three-dimensional map objects data related to said position;
retrieves said graphical three-dimensional map objects data; and
adds said graphical three-dimensional map objects data to said three-dimensional map environment.

16. The device according to claim 13, wherein the processing unit further:
receives information input by a user of the device pertaining to adjusting said transparency level, and wherein the transparency level of each one of said graphical three-dimensional map objects is further adjusted based on the information input by the user of the device.

17. A computer program product stored on a non-transitory computer-readable medium comprising computer program code portions, the computer program product comprising:
executable code that receives a start position and an end position;
executable code that determines a route from the start position to the end position; executable code that determines, for a position on the route, graphical two-dimensional map data related to the position;
executable code that retrieves the graphical two-dimensional map data;
executable code that generates, for the position of the route, navigation instructions by: projecting the graphical two-dimensional map data on a plane in a three-dimensional map environment and adding a representation of the route;
executable code that adds graphical three-dimensional map objects to the projected graphical two-dimensional map data by utilising data of the graphical three-dimensional map objects, wherein each of the graphical three-dimensional map objects comprise a plurality of layers of displayable graphical information;
executable code that receives information pertaining to a current position on the route; executable code that determines object-distance information pertaining to individual distances between a current position on the route and each one of the graphical three-dimensional map objects; and
executable code that sets a transparency level of the graphical three-dimensional map objects, wherein the transparency level is set at a level between, and including, an opaque image and an image shown only in outline, and wherein the transparency level of a particular one of the graphical three-dimensional map objects increases and rendering of the number of the plurality of layers of displayable graphical information of the particular one of the graphical three-dimensional map objects decreases as a distance between the current position and the particular one of the graphical three-dimensional map objects decreases; and
executable code that transmits the navigation instructions to a display.

18. The computer program product according to claim 17, wherein the computer program product further comprises:
executable code that determines at least one of said graphical three-dimensional map objects to be located at a position in said three-dimensional map environment such that a rendered surface of said at least one of said graphical three-dimensional map objects at least partly overlaps said route, and setting the transparency level of said at least one of said graphical three-dimensional map objects such that said route is visible through said rendered surface.

19. The computer program product according to claim 17, wherein the computer program product further comprises:
executable code that determines, for said position of said route, a graphical three-dimensional map objects data related to said position;
executable code that retrieves said graphical three-dimensional map objects data; and
executable code that adds said graphical three-dimensional map objects data to said three-dimensional map environment.

20. The computer program product according to claim 17, wherein the computer program product further comprises:

executable code that receives information input by a user of the device pertaining to adjusting said transparency level, and wherein the transparency level of each one of said graphical three-dimensional map objects is further adjusted based on the information input by the user of the device.

21. A method performed in a device for providing navigation instructions in a three-dimensional map environment, comprising:

receiving a start position and an end position;

determining a route from the start position to the end position;

determining, for a position on the route, graphical two-dimensional map data related to the position;

retrieving the graphical two-dimensional map data;

generating, for the position of the route, navigation instructions by:

projecting the graphical two-dimensional map data on a plane in a three-dimensional map environment and adding a representation of the route;

adding graphical three-dimensional map objects to the projected graphical two-dimensional map data by utilising data of the graphical three-dimensional map objects, wherein each of the graphical three-dimensional map objects comprise a plurality of layers of displayable graphical information;

receiving information pertaining to a current position on the route;

determining object-distance information pertaining to individual distances between a current position on the route and each one of the graphical three-dimensional map objects;

setting a transparency level of at least one of said graphical three-dimensional map objects, wherein the transparency level is set at a level between, and including, an opaque image and an image shown only in outline, and wherein the transparency level of a particular one of the graphical three-dimensional map objects increases and rendering of the number of the plurality of layers of displayable graphical information of the particular one of the graphical three-dimensional map objects decreases as a distance between the current position and the particular one of the graphical three-dimensional map objects decreases; and transmitting the navigation instructions to a display.

* * * * *